(12) United States Patent
Eubank et al.

(10) Patent No.: US 10,782,779 B1
(45) Date of Patent: Sep. 22, 2020

(54) FEEDBACK COORDINATION FOR A VIRTUAL INTERACTION

(71) Applicant: Apple Inc., Cupertino, CA (US)

(72) Inventors: Christopher T. Eubank, Sunnyvale, CA (US); Daniel P. Patterson, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/580,372

(22) Filed: Sep. 24, 2019

Related U.S. Application Data

(60) Provisional application No. 62/737,624, filed on Sep. 27, 2018, provisional application No. 62/811,996, filed on Feb. 28, 2019.

(51) Int. Cl.
*G06F 3/01* (2006.01)
*G10H 1/34* (2006.01)
*G06F 3/16* (2006.01)

(52) U.S. Cl.
CPC .............. *G06F 3/013* (2013.01); *G06F 3/016* (2013.01); *G06F 3/167* (2013.01)

(58) Field of Classification Search
CPC ................ G06T 17/00; G06T 19/00; G06T 2207/30204; G06T 7/292; G05B 2219/2615; G05B 2219/37288; G06K 9/00201; G06F 3/011; G06F 3/016; G06F 3/017; G06F 3/013; G06F 3/048; G06F 3/0304; G06F 3/012; G06F 1/163; G06F 3/042; G06F 3/04845; G06F 16/26; G06F 16/287; A61M 2205/507; A61M 2230/63; A61M 2205/3303; G10H 2220/101; G10H 2220/106; G10H 2220/315; G10H 1/342; G06Q 20/40145; H04N 13/243
See application file for complete search history.

(56) References Cited

U.S. PATENT DOCUMENTS

2002/0036617 A1* 3/2002 Pryor ...................... G06F 3/011
                                                           345/156
2009/0147991 A1* 6/2009 Chau ................... G06K 9/00342
                                                           382/103

(Continued)

*Primary Examiner* — Marlon T Fletcher
(74) *Attorney, Agent, or Firm* — Fernando & Partners, LLP

(57) ABSTRACT

In some implementations, a method includes: obtaining user movement information, wherein the user movement information characterizes real-world body pose and trajectory information of the user; generating, from real-world user movement information and a predetermined placement of the virtual instrument in the computer generated reality (CGR) environment, a predicted virtual instrument interaction time for a virtual instrument interaction prior to the virtual instrument interaction occurring; determining whether or not the predicted virtual instrument interaction time falls within an acceptable temporal range around one of a plurality of temporal sound markers; and in response to determining that the predicted virtual instrument interaction time falls within the acceptable temporal range around a particular temporal sound marker of the plurality of temporal sound markers, quantizing the virtual instrument interaction by presenting play of the virtual instrument to match the particular temporal sound marker of the plurality of temporal sound markers.

30 Claims, 10 Drawing Sheets

(56) References Cited

U.S. PATENT DOCUMENTS

| | | | |
|---|---|---|---|
| 2015/0235452 A1* | 8/2015 | Schowengerdt | G06T 1/60 345/633 |
| 2018/0025710 A1* | 1/2018 | Bencar | G10H 1/0008 463/31 |
| 2019/0043239 A1* | 2/2019 | Goel | G10H 1/368 |
| 2019/0371066 A1* | 12/2019 | Shiff | A63F 13/54 |

* cited by examiner

FEEDBACK COORDINATION FOR A VIRTUAL INTERACTION

CROSS-REFERENCE TO RELATED APPLICATIONS

This application claims the benefit of U.S. Provisional Patent App. Nos. 62/737,624, filed on Sep. 27, 2018 and 62/811,996, filed on Feb. 28, 2018, which are incorporated by reference in their entireties.

TECHNICAL FIELD

The present disclosure generally relates to computer-generated reality (CGR) environments and in particular to feedback coordination for a virtual interaction.

BACKGROUND

Music processing systems (such as music processing systems in CGR environments) should ideally strive to improve temporal precision in musical performances in order to enhance music quality and user experience. This task, known as quantization, may involve presenting playback of sound at a time different from a time of performance of the sound by determining that such a modified presentation is more aligned with intentions of the performer and/or the structure of a piece of music. Existing music processing systems continue to face challenges when it comes to effective and timely quantization of live musical performances.

A feedback device (such as speaker/headphones, a haptics engine, or the like) often has a predetermined latency between initiation of associated feedback (such as audio, haptics, or the like) and user perception of the associated feedback due to, for example, hardware and/or transmission delays. In turn, feedback associated with a virtual interaction in a CGR environment should ideally strive for life-like coordination (or synchronization) between perception of the feedback and occurrence of the virtual interaction itself. However, existing CGR delivery systems continue to face challenges when it comes to effective and timely coordination (or synchronization) between the feedback and the virtual interaction itself.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
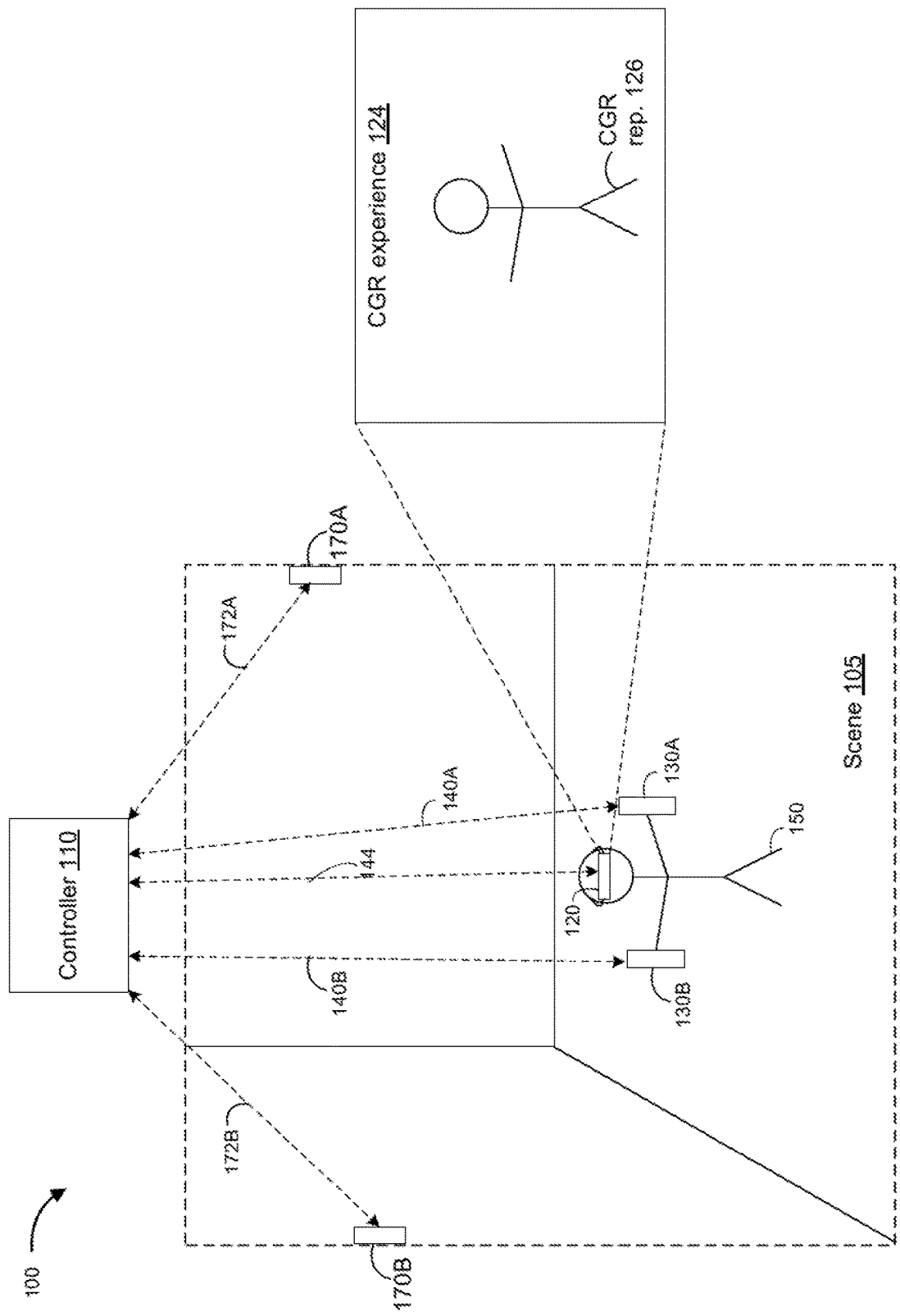
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for predictive quantization of user interaction with a virtual musical instrument in computer-generated reality (CGR) environments. According to some implementations, the method is performed by a device with one or more processors, non-transitory memory, and one or more user interaction hardware components configured to enable a user to play a virtual instrument in a CGR environment. The method also includes: obtaining user movement information, wherein the user movement information characterizes real-world body pose and trajectory information of the user; generating, from real-world user movement information and a predetermined placement of the virtual instrument in the CGR environment, a predicted virtual instrument interaction time for a virtual instrument interaction prior to the virtual instrument interaction occurring; determining whether or not the predicted virtual instrument interaction time falls within an acceptable temporal range around one of a plurality of temporal sound markers; and in response to determining that the predicted virtual instrument interaction time falls within the acceptable temporal range around a particular temporal sound marker of the plurality of temporal sound markers, quantizing the virtual instrument interaction by presenting play of the virtual instrument to match the particular temporal sound marker of the plurality of temporal sound markers.

Various implementations disclosed herein include devices, systems, and methods for generating a predicted virtual interaction time from user movement information prior to a virtual interaction in order to deliver feedback (e.g., sound, haptics, etc.) coordinated with the virtual interaction. According to some implementations, the method is performed by a device with one or more processors, non-transitory memory, one or more user feedback devices, and one or more input devices configured to enable a user to interact with a CGR item in a CGR environment. The method also includes: obtaining user movement information characterizing real-world body pose and trajectory information of the user; generating a predicted virtual interaction time for a virtual interaction based at least in part on a placement of the CGR item in the CGR environment and the user movement information prior to the virtual interaction occurring; determining a first initiation time for a first feedback device among the one or more feedback devices based at least in part on the predicted virtual interaction time and a first predetermined latency period associated with the first feedback device; and initiating at the first initiation time, by the device, first feedback from the first feedback device in order to satisfy a performance criterion that corresponds to the virtual interaction with the CGR item In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some existing CGR systems enable a user to play a virtual musical instrument by translating the real-world body pose of the user and trajectory information (hereinafter "user movement information") into CGR interactions between a CGR avatar/representation associated with the user and the virtual instrument. For example, by translating user movement information, a CGR system presents user play of the virtual instrument, which is provided as CGR feedback (e.g., CGR audio, video, haptics, etc.) in the CGR environment (e.g., virtual collisions of a virtual drumstick with a virtual drum).

For example, a user may not move in synchronization with respect to a piece of music characterized by a plurality of temporal sound markers. As such, a direct translation of user movement information may result in virtual instrument interactions (e.g., virtual collisions on a virtual drum face) that are not in synchronization with one or more of the plurality of temporal sound markers. Various implementations of the present invention enable CGR systems to generate a predicted virtual instrument interaction time from real-world user movement information prior to the virtual instrument interaction occurring. The system determines whether or not the predicted virtual instrument interaction time falls within an acceptable temporal range around one of the plurality of temporal sound markers and quantizes the virtual instrument interaction by presenting play of the virtual instrument to match one of the plurality of temporal sound markers.

As noted above, a feedback device (such as speaker/headphones, haptics engine, or the like) often has a predetermined latency between initiation of associated feedback (such as audio, haptics, or the like) and user perception of the associated feedback due to, for example, hardware and/or transmission delays. In turn, feedback associated with a virtual interaction in a CGR environment should ideally strive for life-like coordination (or synchronization) between perception of the feedback and occurrence of the virtual interaction itself. However, existing CGR delivery systems continue to face challenges when it comes to effective and timely coordination (or synchronization) between the feedback and the virtual interaction itself. Various implementations of the present invention enable CGR systems to generate a predicted virtual interaction time from user movement information prior to the virtual interaction in order to deliver feedback (e.g., sound, haptics, etc.) coordinated with the virtual interaction.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110, a head-mounted device (HMD) 120, hand-held devices 130A and 130B, and optional motion capture devices 170A and 170B. While the exemplary operating environment 100 in FIG. 1 includes two hand-held devices 130A and 130B, those of ordinary skill in the art will appreciate from the present disclosure that the operating environment of various implementations of present invention may include any number of hand-held devices, such as one hand-held device. While the exemplary operating environment 100 in FIG. 1 includes two optional motion capture devices 170A and 170B, those of ordinary skill in the art will appreciate from the present disclosure that the operating environment of various implementations of present invention may include any number of motion capture devices, such as a single motion capture device.

In some implementations, the controller 110 is configured to manage and coordinate a CGR experience for a user 150. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 may be a local server situated within the scene 105. In another example, the controller 110 is a remote server situated outside of the scene 105 (e.g., a cloud server, central server, etc.).

In some implementations, the controller 110 is communicatively coupled with the hand-held devices 130A and 130B via wired or wireless communication channels 140A and 140B (e.g., BLUETOOTH, Institute of Electrical and Electronics Engineers (IEEE) 802.11x, IEEE 802.16x, IEEE 802.3x, etc.). In some implementations, the controller 110 is communicatively coupled with the HMD 120 via a wired or wireless communication channel 144 (e.g., BLUETOOTH, IEEE 802.11x, IEEE 802.16x, IEEE 802.3x, etc.). In some implementations, the controller 110 is communicatively coupled with the motion capture devices 170A and 170B via wired or wireless communication channels 172A and 172B (e.g., BLUETOOTH, IEEE 802.11x, IEEE 802.16x, IEEE 802.3x, etc.). In some implementations, the HMD 120 is communicatively coupled with the hand-held devices 130A and 130B and/or the motion capture devices 170A and 170B via wired or wireless communication channels (e.g., BLUETOOTH, IEEE 802.11x, IEEE 802.16x, IEEE 802.3x, etc.) (not shown).

In some implementations, the HMD 120 is configured to present the CGR experience to the user 150. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 presents a CGR experience 124 to the user 150 while the user 150 is virtually and/or physically present within the scene 105. In some implementations, while presenting an augmented reality (AR) experience, the HMD 120 is configured to present AR content and to enable optical see-through of the scene 105. For example, the CGR experience 124 corresponds to a composite of the AR content and the optical see-through of the scene 105. In some implementations, while presenting a virtual reality (VR) or mixed reality (MR) experience, the HMD 120 is configured to present VR or MR content and to enable video pass-through of the scene 105. For example, the CGR experience 124 corresponds to a composite of the VR or MR content and the video pass-through of the scene 105.

In some implementations, the user 150 wears the HMD 120 on his/her head. As such, the HMD 120 includes one or more displays provided to display CGR content. For example, the HMD 120 encloses the field-of-view of the user 150. For example, the user 150 wears a head-mounted enclosure on his/her head that is capable of receiving or otherwise attaching a mobile device (e.g., a phone, tablet, or the like), wherein the combination thereof functions as the HMD 120. In some implementations, the HMD 120 is replaced with a CGR chamber, enclosure, or room configured to present CGR content in which the user 150 does not wear the HMD 120.

In some implementations, the hand-held devices 130A and 130B provide input data to the controller 110 and/or the HMD 120 while the user 150 is virtually and/or physically within the scene 105. In some implementations, the hand-held devices 130A and 130B provide data describing one or more selections made by the user 150 via interaction hardware mechanisms (e.g., buttons or the like on the hand-held devices 130A and 130B) to the controller 110 and/or the HMD 120. In some implementations, the hand-held devices 130A and 130B provide data describing a position and/or an orientation of the hand-held devices 130A and 130B within the scene 105 to the controller 110 and/or the HMD 120. In some implementations, the controller 110 and/or the HMD 120 may use such position and/or orientation data to estimate a position and/or orientation of the user 150 within the scene 105. In some implementations, the hand-held devices 130A and 130B provide data describing one or more physiological conditions of the user 150 to the controller 110 and/or the HMD 120. For example, the hand-held devices 130A and 130B may provide data describing a heart rate of the user 150, a blood pressure of the user 150, and/or the like to the controller 110 and/or the HMD 120. A hand-held device, such as the hand-held devices 130A or 130B, is described in greater detail below with respect to FIG. 4.

In some implementations, the optional motion capture devices 170A and 170B correspond to fixed or movable sensory equipment within the scene 105 (e.g., image sensors, depth sensors, infrared (IR) sensors, event cameras, etc.). In some implementations, each of the motion capture devices 170A and 170B is configured to provide movement information to the controller 110 and/or the HMD 120 while the user 150 is physically within the scene 105. In some implementations, the motion capture devices 170A and 170B include image sensors (e.g., cameras), and the movement information includes images of the user 150. In some implementations, the movement information characterizes body poses of the user 150 at different times. In some implementations, the movement information characterizes head poses of the user 150 at different times. In some implementations, the movement information characterizes hand tracking information associated with the hands of the user 150 at different times. In some implementations, the movement information characterizes the velocity and/or acceleration of body parts of the user 150 such as his/her hands. In some implementations, the movement information indicates joint positions and/or joint orientations of the user 150. In some implementations, the motion capture devices 170A and 170B include feedback devices such as speakers, lights, or the like.

In some implementations, the HMD 120 presents a CGR experience 124 to the user 150. In some implementations, the HMD 120 includes one or more displays (e.g., a single display or one for each eye). In such implementations, the HMD 120 presents the CGR experience 124 by displaying data corresponding to the CGR experience 124 on the one or more displays or by projecting data corresponding to the CGR experience 124 onto the retinas of the user 150. In the example of FIG. 1, the CGR experience 124 includes a CGR representation 126 of the user 150. In some implementations, the controller 110 and/or the HMD 120 cause the CGR representation 126 to move based the movement information from the HMD 120, the hand-held devices 130A and 130B, and/or the motion capture devices 170A and 170B.

Figure 2:
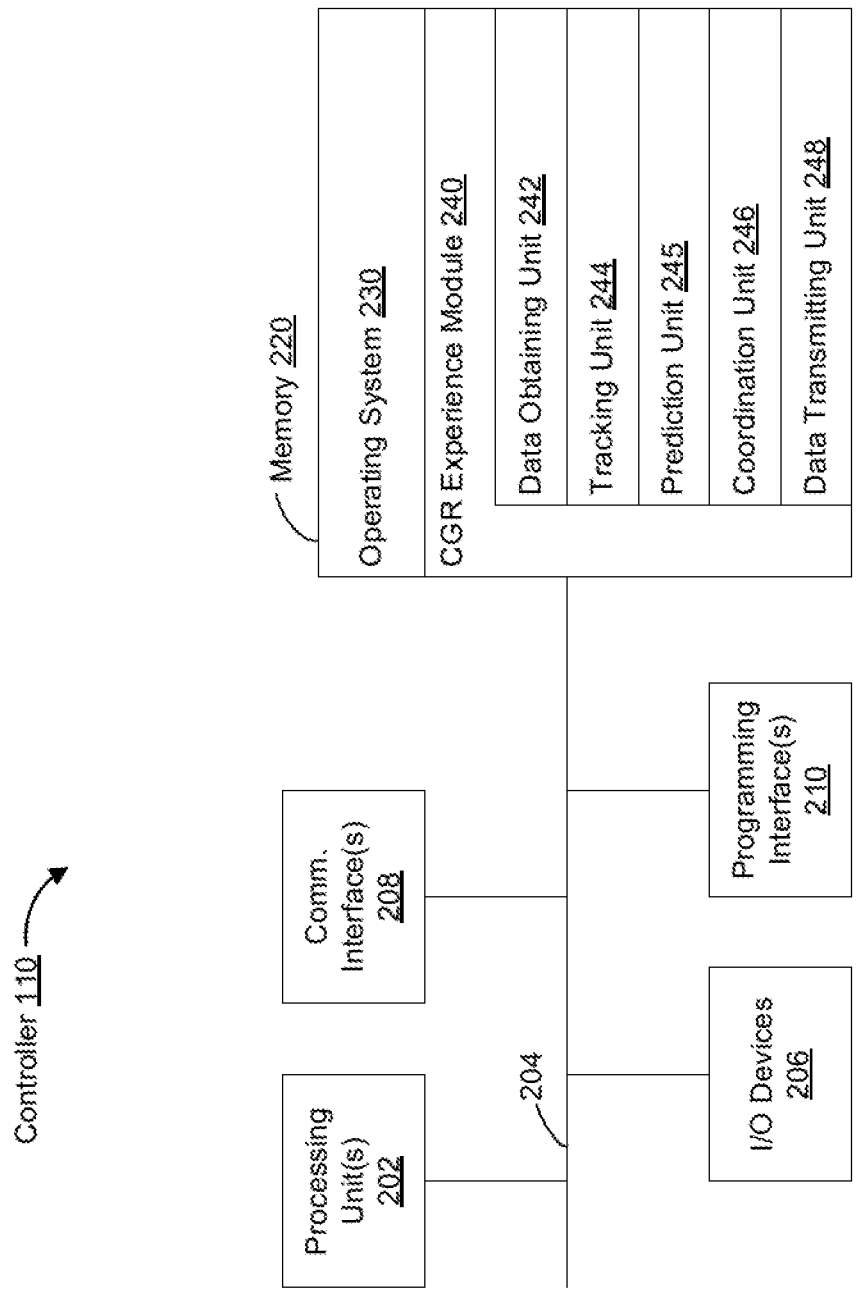
FIG. 2 is a block diagram of an example controller in accordance with some implementations.

FIG. 2 is a block diagram of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a prediction unit 245, a coordination unit 246, and a data transmitting unit 248.

In some implementations, the data obtaining unit 242 is configured to obtain data (e.g., presentation data, interaction data, sensor data such as user movement information, location data, etc.) from at least one of the HMD 120, the hand-held devices 130A and 130B, and/or the optional motion capture devices 170A and 170B. To that end, in various implementations, the data obtaining unit 242 includes instructions and/or logic therefor, and heuristics and metadata therefor.

In some implementations, the tracking unit 244 is configured to map the scene 105 and to track the position/location of at least one of the HMD 120 and the hand-held devices 130A and 130B with respect to the scene 105. To that end, in various implementations, the tracking unit 244 includes instructions and/or logic therefor, and heuristics and metadata therefor.

In some implementations, the prediction unit 245 is configured to generate a predicted virtual interaction time for a virtual interaction based at least in part on a placement of a CGR item in a CGR environment and the user movement information prior to the virtual interaction occurring. To that end, in various implementations, the prediction unit 245 includes instructions and/or logic therefor, and heuristics and metadata therefor.

In some implementations, the coordination unit 246 is configured to manage and coordinate the CGR experience presented to the user 150 by the HMD 120. In some implementations, the coordination unit 246 is also configured to coordinate initiation of feedback associated with the CGR experience based at least in part on the predicted virtual interaction time. In some implementations, the coordination unit 246 sends feedback signals and timing information to the HMD 120, the hand-held devices 130A and 130B, and/or the motion capture devices 170A and 170B in order to coordinate initiation of feedback associated with the CGR experience. To that end, in various implementations, the coordination unit 246 includes instructions and/or logic therefor, and heuristics and metadata therefor.

In some implementations, the data transmitting unit 248 is configured to transmit data (e.g., presentation data, feedback signals and timing information, location data, etc.) to at least one of the HMD 120, the hand-held devices 130A and 130B, and the motion capture devices 170A and 170B. To that end, in various implementations, the data transmitting unit 248 includes instructions and/or logic therefor, and heuristics and metadata therefor.

Although the data obtaining unit 242, the tracking unit 244, the prediction unit 245, the coordination unit 246, and the data transmitting unit 248 are shown as residing on a single device (e.g., the controller 110), it should be understood that in other implementations, any combination of the data obtaining unit 242, the tracking unit 244, the prediction unit 245, the coordination unit 246, and the data transmitting unit 248 may be located in separate computing devices.

Moreover, FIG. 2 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
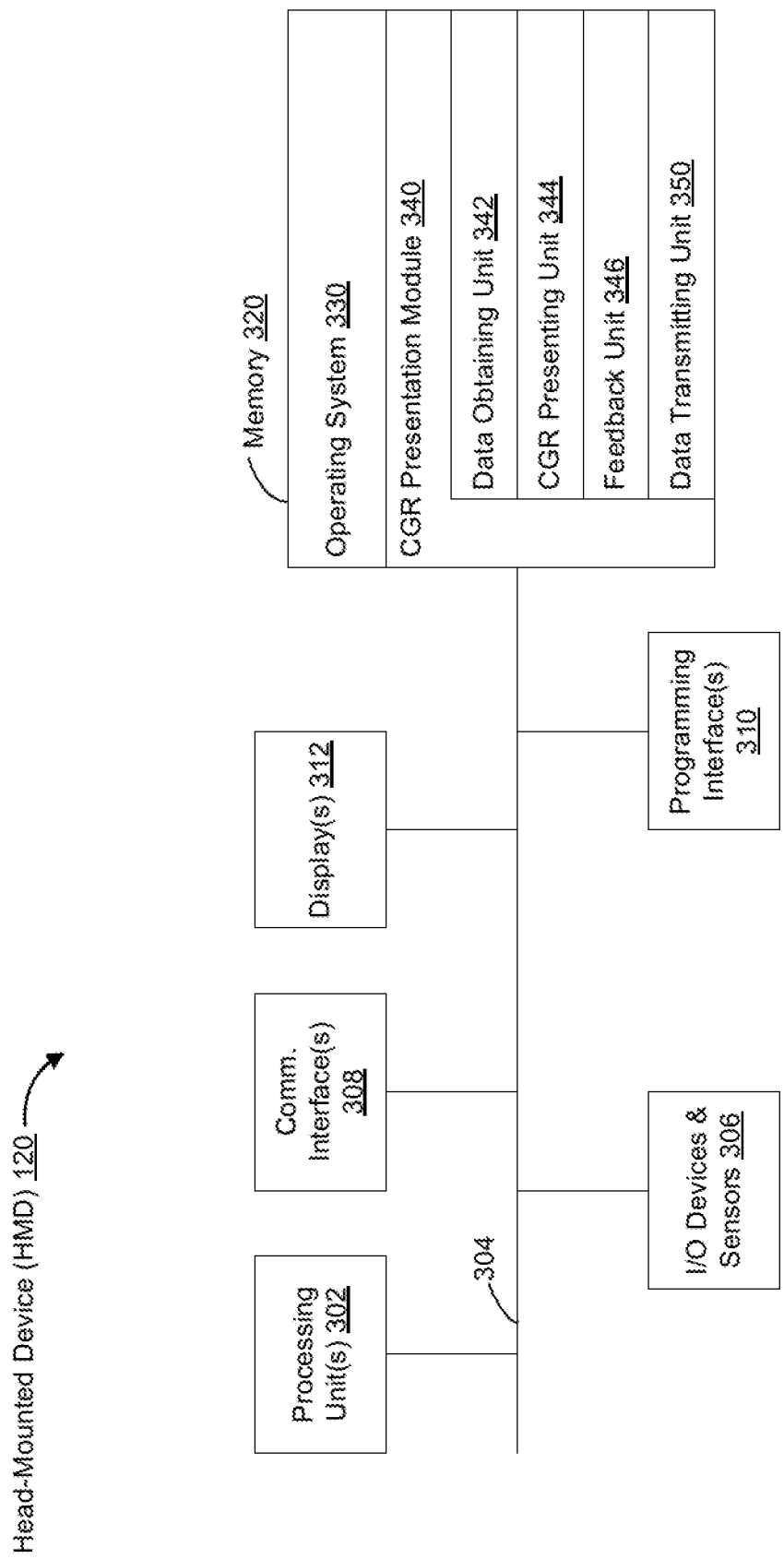
FIG. 3 is a block diagram of an example head-mounted device (HMD) in accordance with some implementations.

FIG. 3 is a block diagram of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the HMD 120 includes one or more processing units 302 (e.g., microprocessors, ASICs, FPGAs, GPUs, CPUs, processing cores, and/or the like), one or more I/O devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more image sensors (e.g., including one or more external-facing images sensors and/or one or more internal-facing image sensors), gaze tracker, and/or the like.

In some implementations, the one or more displays 312 are configured to present the CGR experience to the user 150. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the HMD 120 may include a single display. In another example, the HMD 120 may include a display for each eye of the user 150. In some implementations, the one or more displays 312 are capable of presenting AR, MR, and VR content. In some implementations, the one or more displays 312 are capable of presenting AR, MR, or VR content.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user 150 via the one or more displays 312. To that end, in various implementations, the CGR presentation module 340 includes a data obtaining unit 342, a CGR presenting unit 344, a feedback unit 346, and a data transmitting unit 350.

In some implementations, the data obtaining unit 342 is configured to obtain data (e.g., presentation data, interaction data, sensor data, location data, etc.) from the controller 110, the hand-held devices 130A and 130B, and/or the optional motion capture devices 170A and 170B. To that end, in various implementations, the data obtaining unit 342 includes instructions and/or logic therefor, and heuristics and metadata therefor.

In some implementations, the CGR presenting unit 344 is configured to present CGR content and/or to initiate visual initiate feedback associated with the CGR content via the one or more displays 312. To that end, in various implementations, the CGR presenting unit 344 includes instructions and/or logic therefor, and heuristics and metadata therefor.

In some implementations, the feedback unit 346 is configured to initiate feedback associated with the CGR experience via the one or more I/O devices and sensors 306 (e.g., the haptics engine, the speakers, etc.). To that end, in various implementations, the feedback unit 346 includes instructions and/or logic therefor, and heuristics and metadata therefor.

In some implementations, the data transmitting unit 350 is configured to transmit data (e.g., presentation data, sensor data such as user movement information, location data, etc.) to at least one of the controller 110 and the hand-held devices 130A and 130B. To that end, in various implementations, the data transmitting unit 350 includes instructions and/or logic therefor, and heuristics and metadata therefor.

Although the data obtaining unit 342, the CGR presenting unit 344, the feedback unit 346, and the data transmitting unit 350 are shown as residing on a single device (e.g., the HMD 120), it should be understood that in other implementations, any combination of the data obtaining unit 342, the CGR presenting unit 344, the feedback unit 346, and the data transmitting unit 350 may be located in separate computing devices.

Moreover, FIG. 3 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
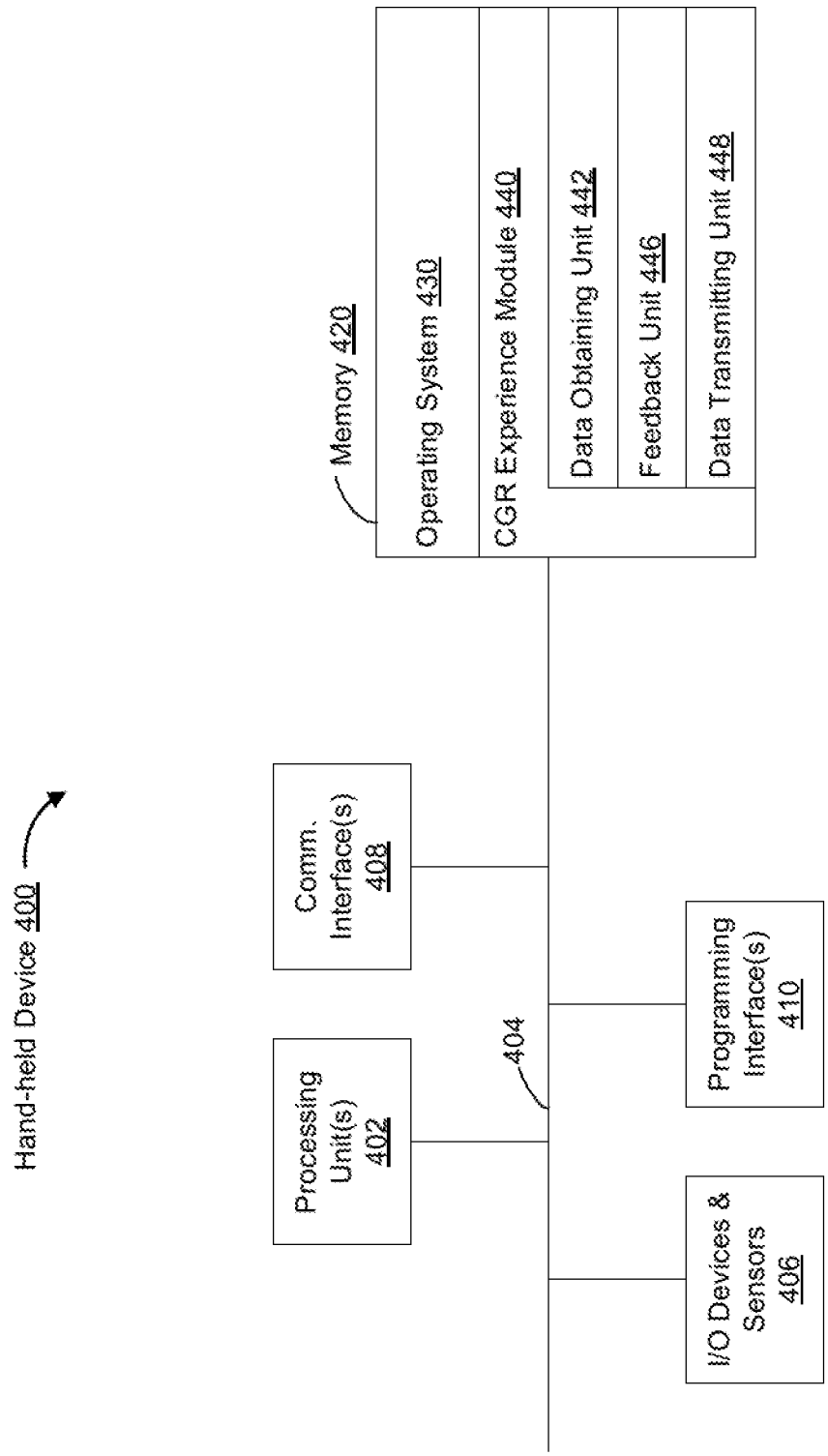
FIG. 4 is a block diagram of an example hand-held device in accordance with some implementations.

FIG. 4 is a block diagram of a hand-held device 400 (e.g., one of the hand-held devices 130A and 130B in FIG. 1) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the hand-held device 400 includes one or more processing units 402 (e.g., microprocessors, ASICs, FPGAs, GPUs, CPUs, processing cores, and/or the like), one or more I/O devices and sensors 406, one or more communication interfaces 408 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of one or more buttons or interaction hardware mechanisms, one or more IMUs, an accelerometer, a gyroscope, a torque meter, a force meter, a thermometer, one or more physiological sensors (e.g., blood pressure monitor, heart rate monitor, blood oxygen sensor, blood glucose sensor, etc.), a haptics engine, a keyboard, a mouse, a touchpad, a joystick, one or more microphones, one or more speakers, one or more image sensors, one or more displays, and/or the like.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a CGR experience module 440.

The operating system 430 includes procedures for handling various basic system services and for performing hardware dependent tasks. In some implementations, the CGR experience module 440 is configured to receive input data from a user 150 and generate data corresponding to a CGR experience for the user 150. For example, the CGR experience module 440 is configured to enable the user 150 to play a virtual musical instrument by translating movement information associated with the user 150 into interactions between the CGR avatar/representation of the user 150 and the virtual instrument. To that end, in various implementations, the CGR experience module 440 includes a data obtaining unit 442, a feedback unit 446, and a data transmitting unit 448.

In some implementations, the data obtaining unit 442 is configured to obtain data (e.g., presentation data, interaction data, sensor data such as user movement information, location data, etc.) from at least one of the controller 110 and the HMD 120. In some implementations, the data obtaining unit 442 is configured to obtain sensor data from the I/O devices and sensors 406 such as velocity, acceleration, force of impact, and/or the like associated with the hand-held device 400. To that end, in various implementations, the data obtaining unit 442 includes instructions and/or logic therefor, and heuristics and metadata therefor.

In some implementations, the feedback unit 446 is configured to initiate feedback associated with the CGR experience via the one or more I/O devices and sensors 406 (e.g., the haptics engine, the speakers, etc.). To that end, in various implementations, the feedback unit 446 includes instructions and/or logic therefor, and heuristics and metadata therefor.

In some implementations, the data transmitting unit 448 is configured to transmit data (e.g., presentation data, sensor data such as user movement information, location data, etc.) to at least one of the controller 110 and the HMD 120. To that end, in various implementations, the data transmitting unit 448 includes instructions and/or logic therefor, and heuristics and metadata therefor.

Although the data obtaining unit 442, the feedback unit 446, and the data transmitting unit 448 are shown as residing on a single device (e.g., the hand-held device 400), it should be understood that in other implementations, any combination of the data obtaining unit 442, the feedback unit 446, and the data transmitting unit 448 may be located in separate computing devices.

Moreover, FIG. 4 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 5A:
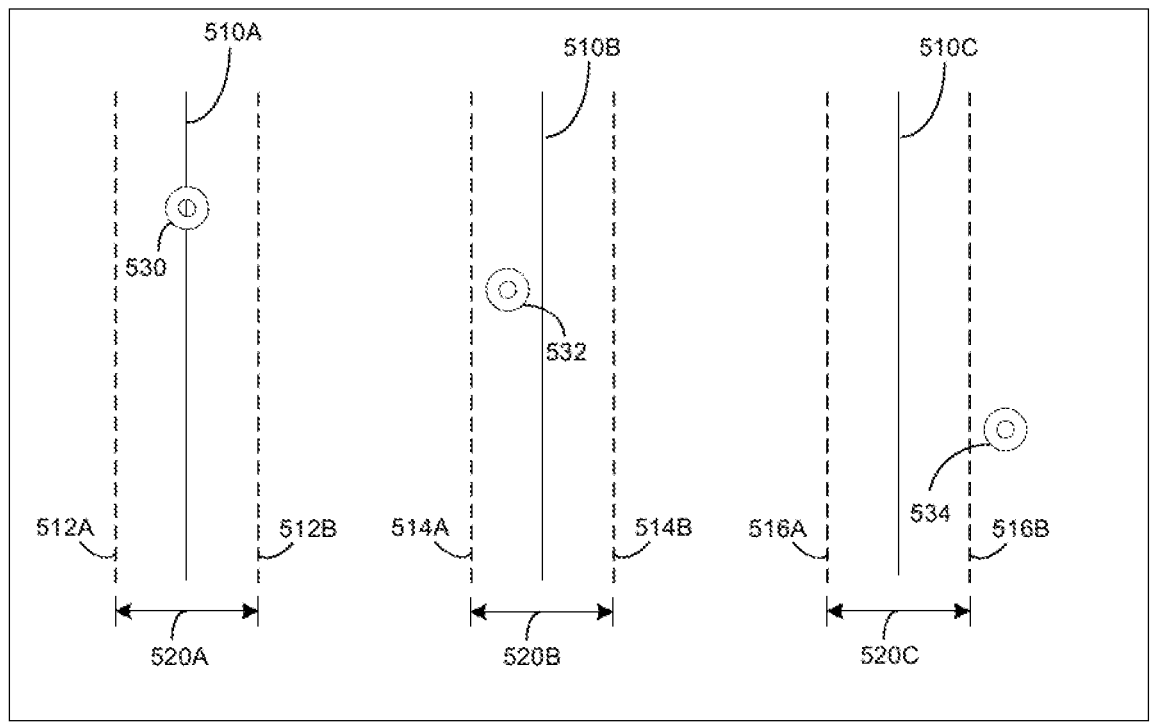
FIGS. 5A and 5B illustrate example virtual instrument interaction data in accordance with some implementations.
Figure 5B:
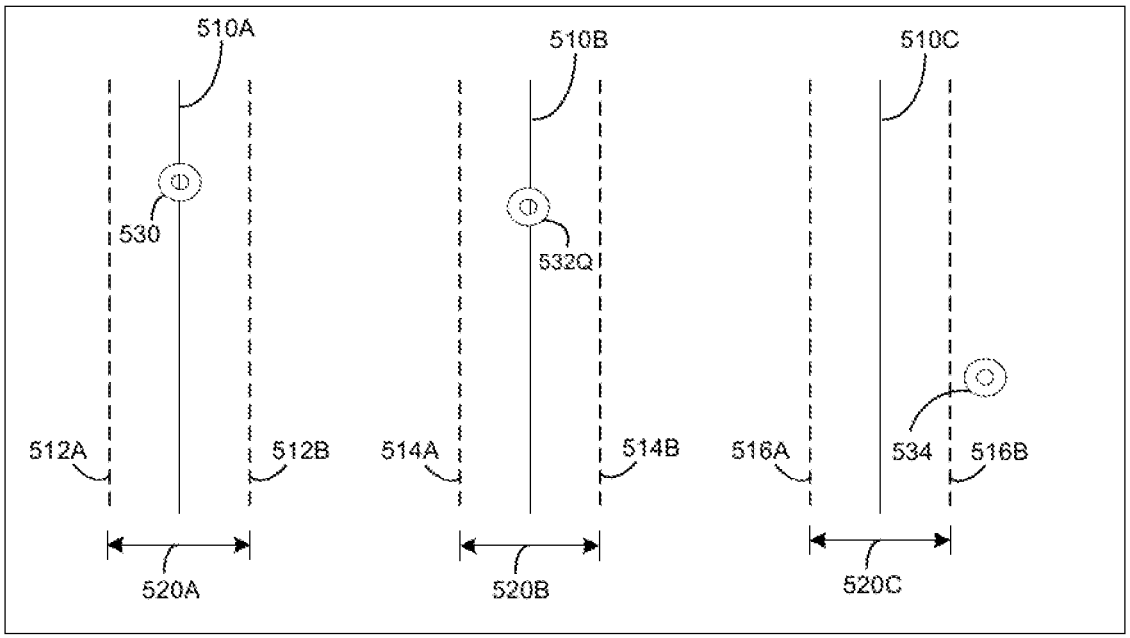

FIGS. 5A and 5B illustrate example virtual instrument interaction data 500/500Q in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, FIG. 5A illustrates example virtual instrument interaction data 500 before quantization, while FIG. 5B illustrates example virtual instrument interaction data 500Q after quantization.

As illustrated in FIGS. 5A and 5B, the virtual instrument interaction data 500/500Q include temporal sound markers 510A-510C. Each temporal sound marker indicates a particular point in time (e.g., an absolute point in time or a point in time defined relative to another point in time, such as a point in time at which a sequence of virtual musical instrument interactions start). In some implementations, the temporal sound markers 510A-510C may define a time space within which virtual instrument interactions occur.

Each the temporal sound markers 510A-510C is associated with an acceptable temporal range 520A-520C, a portion of the time space between thresholds around the temporal sound marker in FIGS. 5A and 5B. For example, a temporal sound marker 510A is associated with the acceptable temporal range 520A bounded by thresholds 512A and 512B, a temporal sound marker 510B is associated with the acceptable temporal range 520B bounded by thresholds 514A and 514B, and a temporal sound marker 520C is associated with the acceptable temporal range 520C bounded by thresholds 516A and 516B. While the virtual instrument interaction data 500/500Q illustrated in FIGS. 5A and 5B depict the acceptable temporal ranges 520A-520C of the various temporal sound markers 510A-510C as being of substantially equal size, those of ordinary skill in the art will appreciate from the present disclosure that each of the temporal sound markers may have an acceptable temporal range that is substantially different in size than the acceptable temporal ranges of other temporal sound markers.

As illustrated in FIGS. 5A and 5B, the virtual instrument interaction data 500/500Q also include virtual instrument interactions 530, 532, 532Q, and 534. Each virtual instrument interaction may describe one or more aspects of a user interaction with a virtual musical instrument. Therefore, a virtual instrument interaction may be associated with one or more properties, such as a predicted pitch of the virtual instrument interaction, a predicted sound intensity of the virtual instrument interaction, a predicted virtual instrument interaction time of the virtual instrument interaction, a predicted note of the virtual instrument interaction, and/or the like. The predicted virtual instrument interaction time of a virtual instrument interaction may indicate a predicted time at which user will experience a virtual collision with a virtual instrument given the real-world body pose and trajectory of the user. In the example virtual instrument interaction data 500 illustrated in FIG. 5A, the predicted virtual instrument interaction time of a virtual instrument interaction is represented by the horizontal location of the virtual instrument interactions 530, 532, and 534 within the virtual instrument interaction data 500. For example, the virtual instrument interaction 530 occurs at a predicted virtual instrument interaction time associated with the temporal sound marker 510A in both FIG. 5A and FIG. 5B.

In some implementations, if a predicted virtual instrument interaction time of a virtual instrument interaction falls within an acceptable temporal range of a temporal sound marker, a device (e.g., the controller 110 in FIGS. 1-2) quantizes the virtual instrument interaction by presenting play of the virtual instrument interaction at the temporal sound marker. For example, FIG. 5A illustrates that the predicted virtual instrument interaction time for the virtual instrument interaction 532 is prior to temporal sound marker 510B but within the acceptable temporal range 520B of the temporal sound marker 510B. In response, the device (e.g., the controller 110 in FIGS. 1-2) does not cause presentation of play of virtual instrument interaction 532. Instead, the device (e.g., the controller 110 in FIGS. 1-2) quantizes the virtual instrument interaction 532 by causing presentation of play of the virtual instrument interaction 532Q at the temporal sound marker 510B, as illustrated in FIG. 5B. In contrast, the predicted virtual instrument interaction time for virtual instrument interaction 534 is outside the acceptable temporal range 520C of temporal sound marker 510C. Thus, the device (e.g., the controller 110 in FIGS. 1-2) does not cause presentation of play of the virtual instrument interaction 534 after the temporal sound marker 510C.

Figure 6:
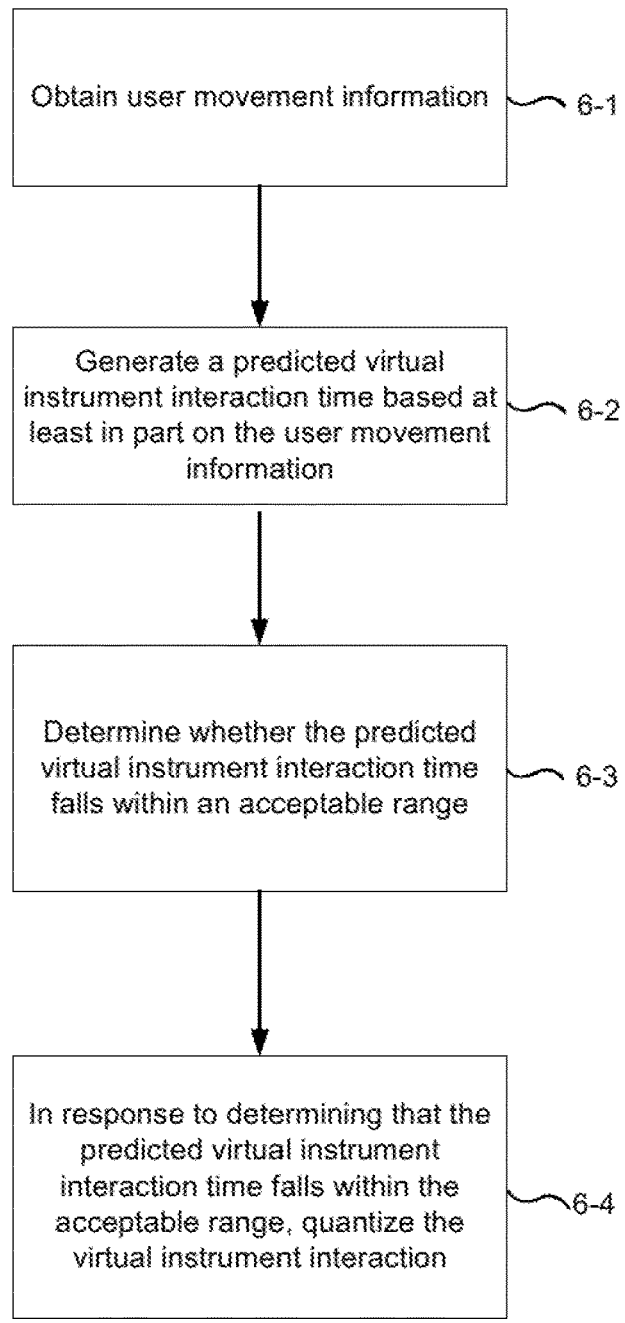
FIG. 6 is a flowchart representation of a method of predictive quantization of a virtual instrument interaction in accordance with some implementations.

FIG. 6 is a flowchart representation of a method 600 of predictive quantization of a virtual instrument interaction in accordance with some implementations. In various implementations, the method 600 is performed by a device (e.g., the controller 110 in FIG. 1, the HMD 120 in FIG. 1, the hand-held devices 130A and 130B in FIG. 1, the and/or a suitable combination thereof) with one or more processors, non-transitory memory, and one or more user interaction hardware components configured to enable a user to play a virtual instrument in a computer-generated reality (CGR) environment. In some implementations, the method 600 is performed by processing logic, including hardware, firmware, software, or a suitable combination thereof. In some implementations, the method 600 is performed by a processor executing code stored in a non-transitory computer-readable medium (e.g., a memory).

As represented by block 6-1, the method 600 includes obtaining user movement information. In some implementations, the user movement information includes data characterizing a real-world pose and trajectory of the user. In some implementations, the user movement information includes information characterizing a velocity, an acceleration, a force of impact, and/or the like of user interaction with at least one user interaction hardware component (e.g., the hand-held devices 130A and 130B in FIG. 1). In some implementations, the user movement information includes information characterizing a direction of the gaze of the user.

In some implementations, the user movement information includes data determined using images captured by image sensors (e.g., within the HMD 120 in FIG. 1, and/or within the hand-held devices 130A and 130B in FIG. 1) and/or data determined using output of IMUs, gyroscopes, accelerometers, torque meter, force meters, and/or other sensors (e.g., within the HMD 120 in FIG. 1, and/or within the hand-held devices 130A and 130B in FIG. 1). For example, the user movement information includes data characterizing the force of impact, angle of impact, and position of impact of the user movement relative to virtual instrument (e.g., drum head, keyboard key, guitar string, or the like) from the IMUs, gyroscopes, accelerometers, torque meter, force meters, and/or other sensors of the hand-held devices 130A and 130B in FIG. 1. In this example, the device uses the motion and predicted collision to determine characteristics of the note to be played. As such, for example, if the user hits a virtual cymbal at high speed, the device plays a louder note based on the predicted speed or force of impact. Or, as another example, if the device predicts that the user will hit a certain portion of the virtual cymbal or that the user's finger will hit a particular key on a virtual piano, the device plays a different sound or plays a different note based on the predicted position or angle of impact.

As another example, the user movement information includes data determined by extracting image features within images captured by image sensors and determining the real-world pose and trajectory of the user based on the extracted image features. The image sensors configured to capture the images may include one or more of: (i) a forward-facing camera configured to capture images from a point of view characterized by an axis substantially parallel to an axis characterizing a point of view of the user; and/or (ii) a non-forward-facing camera (e.g., a downward-facing camera) configured to capture images from a point of view characterized by an axis substantially perpendicular to an axis characterizing a point of view of the user.

In some implementations, the device is configured to translate the user movement information into a virtual instrument interaction. In some implementations, translating the user movement information into a virtual instrument interaction includes determining whether real-world body pose and trajectory of the user falls within a predicted placement of the virtual instrument within a CGR environment, e.g., a three-dimensional region associated with a particular virtual instrument. In some implementations, translating the user movement information into a virtual instrument interaction includes determining whether real-world body pose and trajectory of the user falls within a three-dimensional region associated with a particular virtual instrument interaction, e.g., a three-dimensional region associated with a particular virtual instrument interaction associated with a region of a virtual drum or a key of a virtual keyboard.

As represented by block 6-2, the method 600 includes generating a predicted virtual instrument interaction time for a virtual instrument interaction based at least in part on the user movement information prior to occurrence of the virtual instrument interaction. In some implementations, the device generates the predicted virtual musical instrument time from the user movement information and a predetermined placement of the virtual instrument in the CGR environment. For example, the device: (1) obtains coordinates of a predicted placement of the virtual instrument in the CGR environment; and (2) predicts, given the real-world body pose and the trajectory of the user determined from the user movement information, whether and when the movement pattern of the user will intersect with the predicted placement of the virtual instrument.

As represented by block 6-3, the method 600 includes determining whether the predicted virtual instrument interaction time for the virtual instrument interaction falls within an acceptable temporal range of a temporal sound marker. In some implementations, the device determines an acceptable temporal range for each sound marker and then determines whether the predicted virtual instrument interaction time falls within the acceptable range. In some implementations, the device determines the acceptable temporal range for a sound marker based on data characterizing past user interaction with the device. For example, data characterizing past user interaction with the device may indicate that a user typically has a particular degree of temporal imprecision in his/her interactions with a virtual musical instrument. Thus, in some implementations, the device may determine the acceptable temporal range for a temporal sound marker based on the particular degree of temporal imprecision.

As represented by block 6-4, the method 600 includes quantizing virtual instrument interaction in response to determining that the predicted virtual instrument interaction time for the virtual instrument interaction falls within the acceptable temporal range of a temporal sound marker. In some implementations, in response to determining that the predicted virtual instrument interaction time for the virtual instrument interaction falls within the acceptable temporal range of a particular temporal sound marker, the device presents play of the virtual instrument interaction to match the particular temporal sound marker.

In some implementations, presenting play of the virtual instrument comprises producing one or more CGR feedbacks, such as an audio feedback, a video feedback, a haptic feedback, and/or the like. The device may modify one or more of those CGR feedbacks in response to quantizing virtual instrument interaction. For example, the device may cause an earlier display of virtual collision and/or an earlier generation of haptic feedback.

Figure 7:
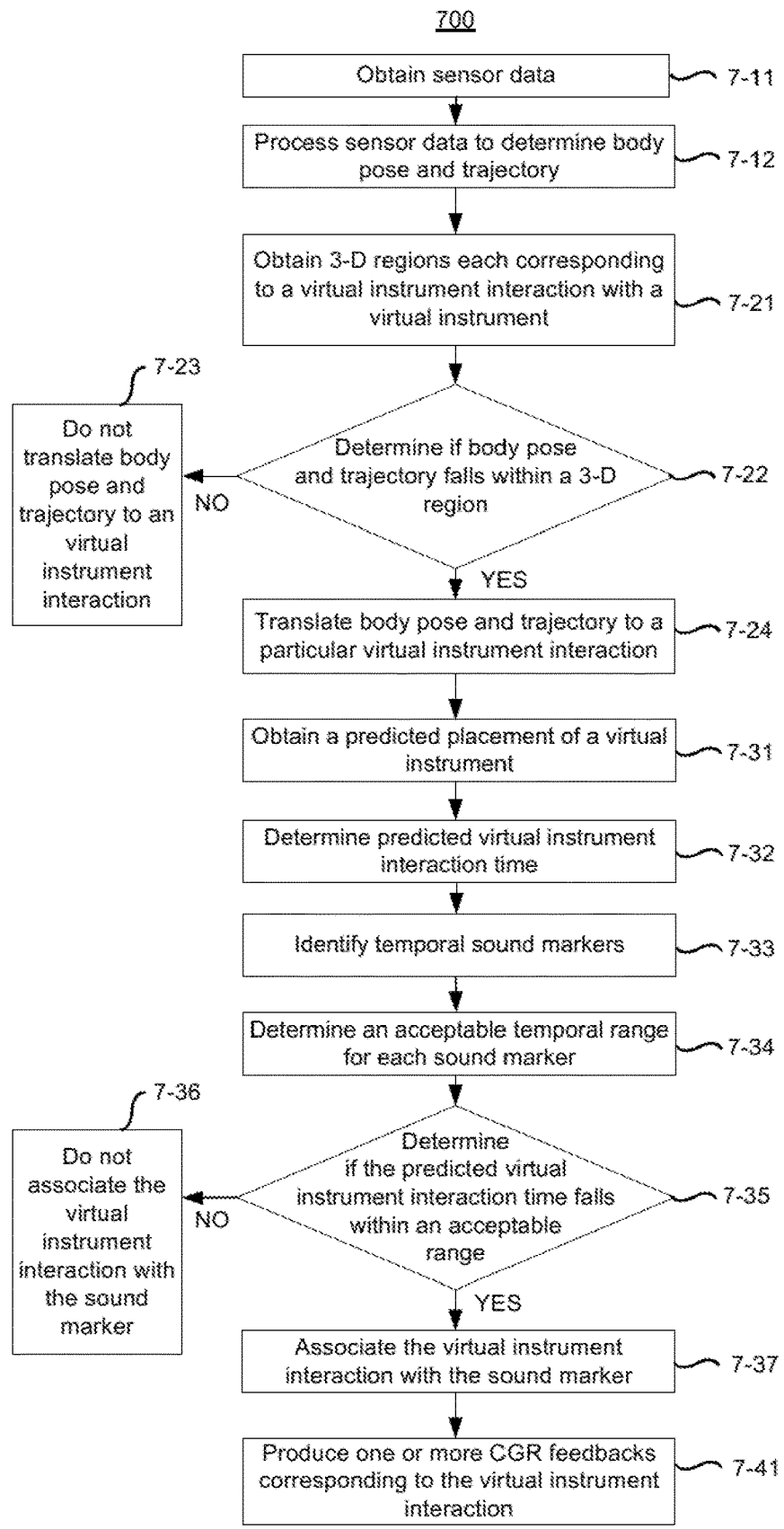
FIG. 7 is a flowchart representation of a method of presenting user play of a virtual musical instrument in accordance with some implementations.

FIG. 7 is a flowchart representation of a method 700 of presenting user play of a virtual musical instrument in accordance with some implementations. In various implementations, the method 700 is performed by a device (e.g., the controller 110 in FIG. 1, the HMD 120 in FIG. 1, the hand-held devices 130A and 130B in FIG. 1, the and/or a suitable combination thereof) with one or more processors, non-transitory memory, and one or more user interaction hardware components configured to enable a user to play a virtual instrument in a computer-generated reality (CGR) environment. In some implementations, the method 700 is performed by processing logic, including hardware, firmware, software, or a suitable combination thereof. In some implementations, the method 700 is performed by a processor executing code stored in a non-transitory computer-readable medium (e.g., a memory).

As represented by block 7-11, the method 700 includes obtaining sensor data. In some implementations, the sensor data includes data obtained from one or more sensors (e.g., associated with the HMD 120 in FIG. 1, and/or associated with the hand-held devices 130A and 130B in FIG. 1). Examples of sensors include image sensors and IMUs.

As represented by block 7-12, the method 700 includes processing the sensor data to determine the body pose and trajectory of the user. For example, the device may determine real-world body pose and trajectory of the user based on features in one or more images captured by one or more image sensors. In some implementations, the device may supply information determined using images and information determined using IMUs as inputs to a machine learning model configured to determine real-world body pose and trajectory based on the inputs.

As represented by block 7-21, the method 700 includes obtaining three-dimensional regions (e.g., in a CGR environment) corresponding to a particular virtual instrument interaction with the virtual instrument. For example, the device may obtain coordinates that define placement of a region of a virtual drum or a key of a virtual keyboard within the CGR environment.

As represented by block 7-22, the method 700 includes determining whether the body pose and trajectory of the user fall within one of the three-dimensional regions associated with a particular virtual instrument interaction with the virtual instrument. For example, the device determines whether the real-world body pose and trajectory falls within the three-dimensional region for placement of a region of a virtual drum or a key of a virtual keyboard.

If the device determines that the body pose and trajectory of the user do not fall within the three-dimensional region for any virtual instrument interactions (the "NO" branch from block 7-22) the method 700 includes not translating the body pose and trajectory to a virtual instrument interaction as represented by block 7-23. If the device determines that the body pose and trajectory fall within one of the three-dimensional regions associated with a particular virtual instrument interaction (the "YES" branch from block 7-22), method 700 includes translating the body pose and trajectory of the user to the particular virtual instrument interaction.

According to some implementations, as represented by blocks 7-31 through 7-37, the method 700 includes quantizing the virtual instrument interaction. As represented by block 7-31, the method 700 includes obtaining a predicted placement (e.g., three-dimensional coordinates) of a virtual instrument within the CGR environment. As represented by block 7-32, the methods 700 includes determining a predicted virtual instrument interaction time for the virtual instrument interaction based on both: (i) the body pose and trajectory of the user; and (ii) the predicted placement of the virtual instrument. As represented by block 7-33, the method 700 includes identifying one or more temporal sound markers. As represented by block 7-34, the method 700 also includes determining an acceptable temporal range for each sound marker. As represented by block 7-35, the method 700 includes determining whether the predicted virtual instrument interaction time for the virtual instrument interaction falls within the acceptable temporal range of a particular temporal sound marker.

If the predicted virtual instrument interaction time for the virtual instrument interaction does not fall within the acceptable temporal range of a particular temporal sound marker (the "NO" branch from block 7-35), the method 700 includes not associating the virtual instrument interaction with the particular temporal sound marker as represented by block 7-36. If the predicted virtual instrument interaction time for the virtual instrument interaction falls within the acceptable temporal range of a particular temporal sound marker (the "YES" branch from block 7-35), the method 700 includes associating the virtual instrument interaction with the particular temporal sound marker as represented by block 7-37.

As represented by block 7-41, the method 700 includes producing one or more CGR feedbacks (e.g., audio feedback, haptic feedback, and/or the like) corresponding to the virtual instrument interaction. In some implementations, a CGR feedback may be any output of a device associated with a CGR system (e.g., an output from the HMD 120 in FIGS. 1 and 3, or an output from the hand-held devices 130A and 130B in FIG. 1). Examples of CGR feedbacks include audio feedbacks, video feedbacks, and haptic feedbacks. The device may modify one or more of those CGR feedbacks in response to quantizing virtual instrument interaction.

In some implementations, if the predicted virtual instrument interaction time for the virtual instrument interaction does not fall within the acceptable temporal range of a particular temporal sound marker (the "NO" branch from block 7-35), the method 700 includes, producing one or more CGR feedbacks (e.g., audio feedback, haptic feedback, and/or the like) at the actual impact time (or latency compensated impact time as described below with respect to the method 800) rather than at the quantized time.

Figure 8:
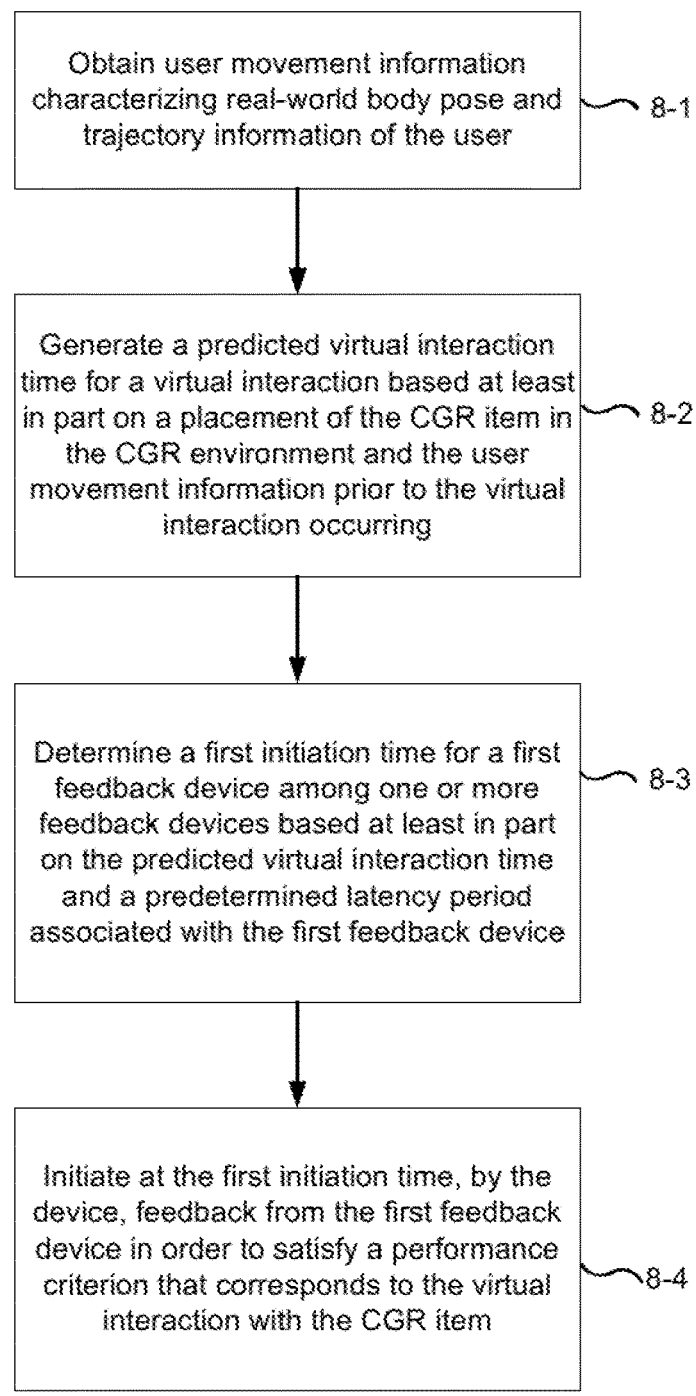
FIG. 8 is a flowchart representation of a method of delivering feedback coordinated with a virtual interaction in accordance with some implementations.

FIG. 8 is a flowchart representation of a method 800 of delivering feedback coordinated with a virtual interaction in accordance with some implementations. In various implementations, the method 800 is performed by a device (e.g., the controller 110 in FIG. 1, the HMD 120 in FIG. 1, the hand-held devices 130A and 130B in FIG. 1, and/or a suitable combination thereof) with one or more processors, non-transitory memory, one or more feedback devices, and one or more input devices configured to enable a user to interact with a computer-generated reality (CGR) item in a CGR environment. In some implementations, the method 800 is performed by processing logic, including hardware, firmware, software, or a suitable combination thereof. In some implementations, the method 800 is performed by a processor executing code stored in a non-transitory computer-readable medium (e.g., a memory).

In some implementations, the device corresponds to the controller 110 in FIGS. 1 and 2. In some implementations, the device corresponds to a hand-held electronic device (e.g., a mobile phone, tablet, laptop, wearable computing device, or the like) and the CGR environment corresponds to a composite of video pass-through or optical see-through of a physical environment with CGR content, including the CGR item. In some implementations, the device corresponds to a head-mounted device (e.g., the HMD 120 in FIG. 1).

In some implementations, the one or more feedback devices correspond to a haptics engine, display devices, audio generation devices, and/or the like. For example, the one or more feedback devices are embedded in the HMD 120 in FIG. 1, the hand-held devices 130A and 130B in FIG. 1, and/or a suitable combination thereof. In some implementations, the one or more input devices correspond to buttons, joysticks, an IMU, a gyroscope, an accelerometer, image sensors, physiological sensors, grip sensors, a gazer tracker, microphones, and/or the like. For example, the one or more inputs devices are embedded in the HMD 120 in FIG. 1, the hand-held devices 130A and 130B in FIG. 1, the motion capture devices 170A and 170B in FIG. 1, and/or a suitable combination thereof.

As represented by block 8-1, the method 800 includes obtaining user movement information characterizing real-world body pose and trajectory information of the user. As one example, with reference to FIGS. 1 and 2, the controller 110 or a component thereof (e.g., the data obtaining unit 242) obtains the user movement information from the HMD 120, the hand-held devices 130A and 130B, and/or the optional motion capture devices 170A and 170B shown in FIG. 1.

In some implementations, obtaining the user movement information includes receiving the user movement information from a local and/or remote source. In some implementations, obtaining the user movement information includes retrieving the user movement information from a local and/or remote source. In some implementations, obtaining the user movement information includes generating the user movement information based on locally captured and/or remotely captured sensor data. For example, the device generates the user movement information based on sensor data from image sensors, accelerometers, gyroscopes, depth sensors, IMUs, IR sensors, gaze trackers, and/or the like of the HMD 120, the hand-held devices 130A and 130B, and/or the optional motion capture devices 170A and 170B shown in FIG. 1.

In some implementations, the user movement information includes information characterizing a velocity of a user interaction with at least one of the one or more input devices (e.g., the hand-held devices 130A and 130B in FIG. 1). In some implementations, the user movement information includes information characterizing an acceleration of a user interaction with at least one of the one or more input devices (e.g., the hand-held devices 130A and 130B in FIG. 1). In some implementations, the user movement information includes information characterizing a direction of user gaze.

In some implementations, obtaining the user movement information includes determining the user movement information using one or more image sensors. For example, the image sensors are local to the device (e.g., the image sensors of the HMD 120 in FIG. 1) and/or remote from the device (e.g., the image sensors of the hand-held devices 130A and 130B in FIG. 1 and/or the motion capture devices 170A and 170B in FIG. 1). In some implementations, the one or more image sensors include a forward-facing camera, wherein the forward-facing camera is configured to capture images from a point of view characterized by an axis substantially parallel to an axis characterizing a point of view of the user. In some implementations, the one or more image sensors include a non-forward-facing camera, wherein the non-forward-facing camera is configured to capture images from a point of view characterized by an axis substantially perpendicular to an axis characterizing a point of view of the user. For example, the non-forward-facing camera is a downward-facing camera.

As represented by block 8-2, the method 800 includes generating a predicted virtual interaction time for a virtual interaction based at least in part on a placement of the CGR item in the CGR environment and the user movement information prior to the virtual interaction occurring. As one example, with reference to FIGS. 1 and 2, the controller 110 or a component thereof (e.g., the prediction unit 245) generates a predicted virtual interaction time for a virtual interaction based at least in part on a placement of the CGR item in the CGR environment and the user movement information obtained by the controller 110 or a component thereof (e.g., the data obtaining unit 242).

In some implementations, the virtual interaction corresponds to a collision with the CGR item. For example, the virtual interaction corresponds to a collision between the CGR item and the user of a CGR item controlled by the user that causes a temporal event such as hitting a CGR drum head with a CGR drum stick, hitting a CGR baseball with a CGR baseball bat, swinging a CGR hammer into a CGR board, striking a CGR punching bag with an avatar's CGR fists, or the like.

In some implementations, the device obtains coordinates for CGR items within the CGR environment. In some implementations, the placement of the CGR item in the CGR environment includes coordinates of at least one surface of the CGR item in the CGR environment.

As represented by block 8-3, the method 800 includes determining a first initiation time for a first feedback device among the one or more feedback devices (e.g., an audio generator, haptics engine, or the like) based at least in part on the predicted virtual interaction time and a first predetermined latency period associated with the first feedback device. As one example, with reference to FIGS. 1 and 2, the controller 110 or a component thereof (e.g., the coordination unit 246) determines a first initiation time for a first feedback device based at least in part on the predicted virtual interaction time determined by the controller 110 or a component thereof (e.g., the prediction unit 245) and a first predetermined latency period associated with the first feedback device. In some implementations, the device obtains predetermined latency periods for the one or more feedback devices from a local source (e.g., a library associated with the functions, latency, historical transmission delays, and/or the like for the feedback devices) and/or a remote source (e.g., the feedback devices themselves, a remote library, and/or the like).

In some implementations, determining the first initiation time for the first feedback device includes determining the first initiation time for the first feedback device among the one or more feedback devices (e.g., an audio generator, haptics engine, or the like) based at least in part on the predicted virtual interaction time, the first predetermined latency period associated with the first feedback device, and a perception attribute associated with the first feedback device. For example, the perception attribute corresponds to the physics associated with the modality of the feedback device (e.g., speed of light for a display device versus the speed of sound for an audio generation device). In another example, the perception attribute corresponds to the physiological reaction to and/or perception of feedback associated with the first feedback device by the user. In some implementations, the perception attribute accounts for the speed of sound versus speed of light by adding delay associated with real-world phenomena. As such, for example, audio may be heard by the user after the virtual interaction is perceived visually by the user.

In some implementations, determining the first initiation time for the first feedback device includes determining the first initiation time for the first feedback device among the one or more feedback devices (e.g., an audio generator, haptics engine, or the like) based at least in part on the predicted virtual interaction time, the first predetermined latency period associated with the first feedback device, and a delay factor. In some implementations, the delay factor provides for a "delayed reaction" such as a tingling or stinging sensation that occurs Y milliseconds after the virtual interaction.

As represented by block 8-4, the method 800 includes initiating at the first initiation time, by the device, first feedback from the first feedback device in order to satisfy a performance criterion that corresponds to the virtual interaction with the CGR item. As one example, with reference to FIGS. 1 and 2, the controller 110 or a component thereof (e.g., the coordination unit 246) causes initiation of the first feedback, by the first feedback device, at the first initiation time. In some implementations, initiating at the first initiation time, by the device, first feedback from the first feedback device includes, for example, generating an audio signal associated with the first feedback at the first initiation time and transmitting (or providing) the audio signal to an audio generation device (e.g., the first feedback device).

In some implementations, the performance criterion corresponds to a synchronization tolerance between the various feedback modalities for the virtual interaction (e.g., X milliseconds tolerance). In some implementations, the performance criterion corresponds to a sensation profile associated with the virtual interaction—different virtual interactions are associated with different modalities of feedback and timing thereof. For example, if a user is swinging a CGR bat to hit a CGR baseball, a baseball striking interaction is associated with a sensation profile that includes: (A) visual feedback associated with the bat impacting the baseball (e.g., a flash of light for an exaggerated indication of the virtual interaction), (B) haptic feedback associated with the bat impacting the baseball, (C) audio feedback associated with the bat impacting the baseball, and (D) delayed haptic feedback associated with a stinging sensation following the bat impacting the baseball. Those of ordinary skill in the art will appreciate from the present disclosure that different virtual interactions can be associated with different sensation profiles in various implementations.

In some implementations, the first feedback generated by the first feedback device corresponds to audio feedback. In some implementations, the first predetermined latency period associated with the first feedback device is based at least in part on BLUETOOTH headphones/speakers latency. In some implementations, as will be understood by one of ordinary skill in the art, the first latency predetermined latency period (e.g., audio feedback latency) is based at least in part on one of various wireless communication protocols (e.g., BLUETOOTH, ZIGBEE, NFC, WiFi, LTE, 3G, or the like). For example, with reference to FIG. 1, the BLUETOOTH headphones/speakers latency corresponds to: (A) generation of an audio signal by the controller 110, (B) transmission of the audio signal to the HMD 120 including the BLUETOOTH headphones/speakers (e.g., via a BLUETOOTH communication channel between the controller 110 and the HMD 120), and (C) playback of the audio signal by the BLUETOOTH headphones/speakers integrated with the HMD 120.

In some implementations, the first feedback generated by the first feedback device corresponds to haptic feedback. In some implementations, the first predetermined latency period associated with the first feedback device is based at least in part on a motor latency. For example, the motor latency corresponds to: (A) generation of a haptics profile/signal by the controller 110, (B) transmission of the haptics profile/signal to a haptics engine, and (C) actuation, based on the haptics profile/signal, of a stepper motor, servo motor, linear motor, and/or the like associated with the haptics engine (e.g., the haptics engine is integrated with the HMD 120 and/or the hand-held devices 130A and 130B in FIG. 1).

In some implementations, the first feedback generated by the first feedback device corresponds to video feedback. In some implementations, the first predetermined latency period associated with the first feedback device is based at least in part on a video pipeline latency. For example, with reference to FIG. 1, the video pipeline latency corresponds to: (A) rendering of a frame associated with the CGR experience by the controller 110, (B) transmission of the frame to the HMD 120, and (C) display of the frame by a display device of the HMD 120.

In some implementations, the method 800 further includes determining a second initiation time for a second feedback device among the one or more feedback devices (e.g., an audio generator, haptics engine, or the like) based at least in part on the predicted virtual interaction time and a second predetermined latency period associated with the second feedback device. In some implementations, the second initiation time is different from the first initiation time, and wherein a feedback coordination engine coordinates initiating at the first initiation time, by the device, the first feedback from the first feedback device and initiating at the second initiation time, by the device, the second feedback from the second feedback device at the second initiation time in order to satisfy the performance criteria that correspond to the virtual interaction with the CGR item. In some implementations, the first and second feedback devices correspond to different feedback modalities. For example, the first feedback device produces audio feedback, and the second feedback device produces haptic feedback.

In some implementations, the method 800 further includes: determining whether or not the predicted virtual interaction time is within an acceptable temporal range around one of a plurality of temporal sound markers; and, in response to determining that the predicted virtual interaction falls within the acceptable temporal range around a particular temporal sound marker of the plurality of temporal sound markers, quantizing the virtual interaction by presenting the virtual interaction to match the particular temporal sound marker of the plurality of temporal sound markers. In some implementations, the CGR item corresponds to a virtual instrument.

Figure 9:
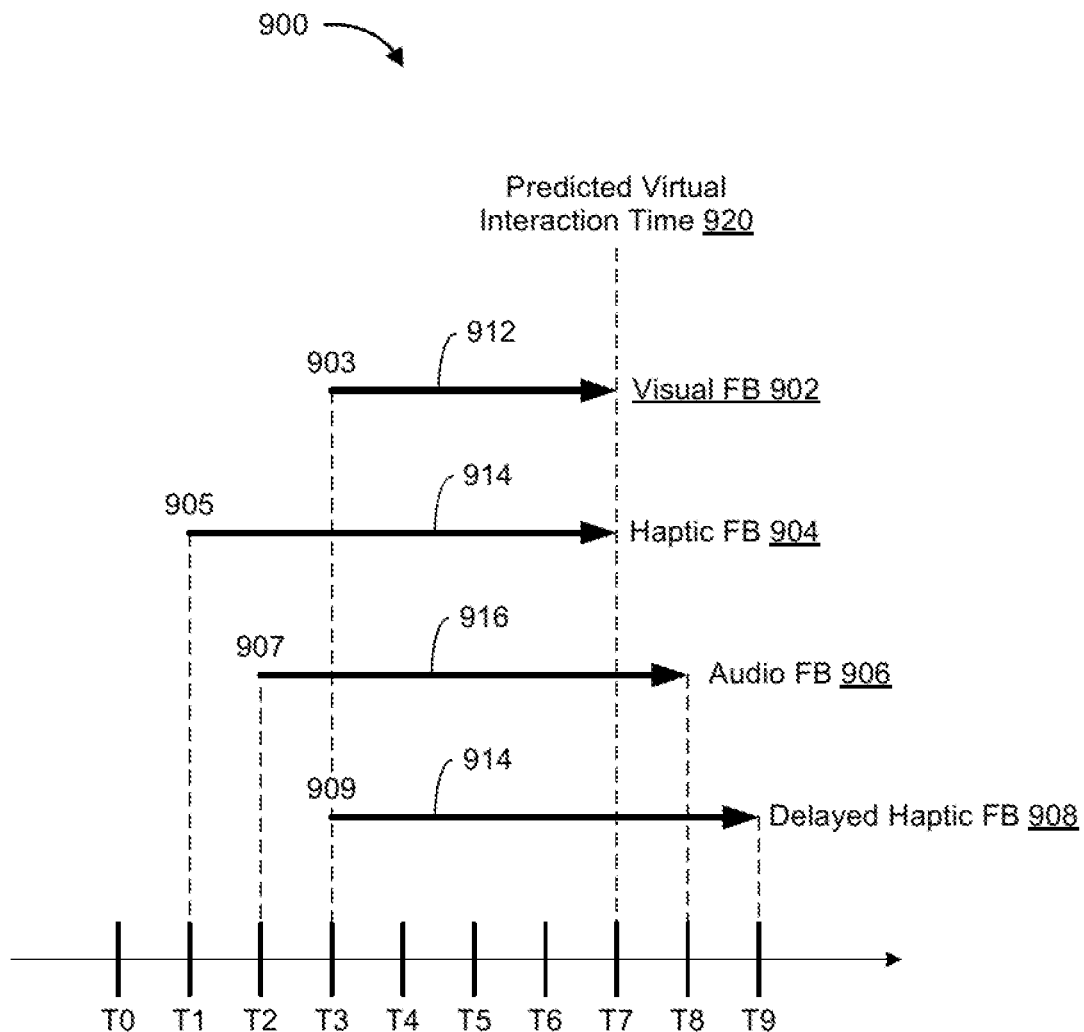
FIG. 9 is a timing diagram for coordinating feedback from various feedback devices in accordance with some implementations.

FIG. 9 is a timing diagram 900 for coordinating feedback from various feedback devices in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the timing diagram 900 is associated with a virtual interaction (e.g., a baseball striking interaction) associated with a sensation profile that includes visual feedback 902, haptic feedback 904, audio feedback 906, and delayed haptic feedback 908.

In some implementations, each virtual interaction is associated with a sensation profile that includes different feedback modalities and timings therefor. For example, if a user is swinging a CGR bat to hit a CGR baseball within a CGR environment, the virtual interaction (e.g., striking the CGR baseball) is associated with a sensation profile that includes: (A) the visual feedback 902 associated with the bat impacting the baseball (e.g., a flash of light for an exaggerated indication of the virtual interaction), (B) the haptic feedback 904 associated with the bat impacting the baseball, (C) the audio feedback 906 associated with the bat impacting the baseball, and (D) the delayed haptic feedback 908 associated with a stinging sensation following the bat impacting the baseball.

With reference to FIGS. 1 and 2, the controller 110 or a component thereof (e.g., the prediction unit 245) determines a predicted virtual interaction time 920 (T7) based on a placement of a CGR item (e.g., the CGR baseball) in a CGR environment and user movement information (e.g., position, velocity, and acceleration of the CGR bat). Generation of a predicted virtual interaction time is described in more detail above with respect to FIG. 8 and, more specifically, the block 8-2 of the method 800.

With reference to FIGS. 1 and 2, the controller 110 or a component thereof (e.g., the coordination unit 246) determines an initiation time 903 (T3) for the visual feedback 902 associated with a display device based at least in part on the predicted virtual interaction time 920 and a predetermined latency 912 associated with the display device and/or the video delivery pipeline associated therewith. For example, the predetermined latency 912 corresponds to a sum of the time spent: (i) rendering a frame associated with the CGR experience by the controller 110, (ii) transmitting the frame to the HMD 120, and (iii) displaying of the frame by the display device of the HMD 120.

With reference to FIGS. 1 and 2, the controller 110 or a component thereof (e.g., the coordination unit 246) determines an initiation time 905 (T1) for the haptic feedback 904 associated with a haptics engine based at least in part on the predicted virtual interaction time 920 and a predetermined latency 914 associated with the haptics engine and/or the haptics delivery pipeline associated therewith. For example, the predetermined latency 914 corresponds to a sum of the time spent: (i) generating a haptics profile/signal associated with the CGR experience by the controller 110, (ii) transmitting the haptics profile/signal to the haptics engine (e.g., integrated with the HMD 120 and/or the hand-held devices 130A and 130B in FIG. 1), and (iii) actuating, based on the haptics profile/signal, of a stepper motor, servo motor, linear motor, and/or the like associated with the haptics engine.

With reference to FIGS. 1 and 2, the controller 110 or a component thereof (e.g., the coordination unit 246) determines an initiation time 907 (T2) for the audio feedback 906 associated with an audio generation device (e.g., headphones, speakers, or the like) based at least in part on the predicted virtual interaction time 920, a predetermined latency 916 associated with the audio generation device and/or the audio delivery pipeline associated therewith, and a perception attribute associated with the audio generation device (e.g., the speed of sound). For example, the predetermined latency 916 corresponds to a sum of the time spent: (i) generating an audio signal associated with the CGR experience by the controller 110, (ii) transmitting the audio signal to the audio generation device (e.g., integrated with the HMD 120 and/or the hand-held devices 130A and 130B in FIG. 1), and (iii) playing back the audio signal by the audio generation device.

With reference to FIGS. 1 and 2, the controller 110 or a component thereof (e.g., the coordination unit 246) determines an initiation time 909 (T3) for the delayed haptic feedback 908 associated with the haptics engine based at least in part on the predicted virtual interaction time 920, the predetermined latency 914 associated with the haptics engine and/or the haptics delivery pipeline associated therewith, and a delay factor.

As a result, with continued reference to FIGS. 1 and 2, the controller 110 or a component thereof (e.g., the coordination unit 246) coordinates feedback for the virtual interaction (e.g., striking the CGR baseball) such that the visual feedback 902 and the haptic feedback 904 occur at the predicted virtual interaction time 920 (T7). With reference to FIGS. 1 and 2, the controller 110 or a component thereof (e.g., the coordination unit 246) coordinates feedback for the virtual interaction such that the audio feedback 906 occurs after the predicted virtual interaction time 920 (at T8) in order to account for the difference between the speed of light and the speed of sound. With reference to FIGS. 1 and 2, the controller 110 or a component thereof (e.g., the coordination unit 246) coordinates feedback for the virtual interaction such that the delayed haptic feedback 908 occurs after the predicted virtual interaction time 920 (at T9) in order to provide a delayed feedback effect (e.g., a stinging or tingling after-effect).

Figure 10:
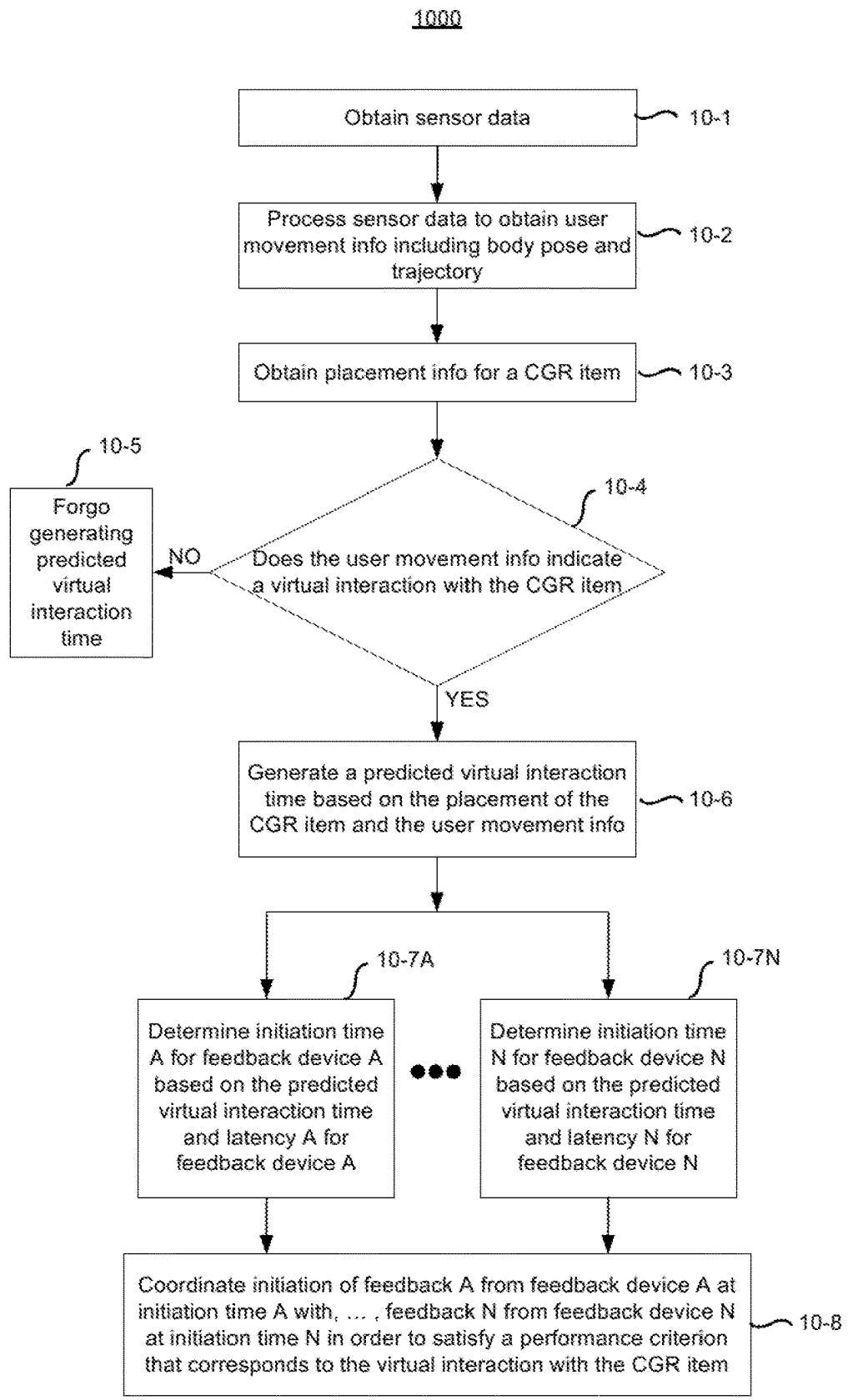
FIG. 10 is a flowchart representation of a method of delivering feedback coordinated with a virtual interaction in accordance with some implementations.

FIG. 10 is a flowchart representation of a method 1000 of delivering feedback coordinated with a virtual interaction in accordance with some implementations. In various implementations, the method 1000 is performed by a device (e.g., the controller 110 in FIG. 1, the HMD 120 in FIG. 1, the hand-held devices 130A and 130B in FIG. 1, and/or a suitable combination thereof) with one or more processors, non-transitory memory, one or more feedback devices, and one or more input devices configured to enable a user to interact with a computer-generated reality (CGR) item in a CGR environment. In some implementations, the method 1000 is performed by processing logic, including hardware, firmware, software, or a suitable combination thereof. In some implementations, the method 1000 is performed by a processor executing code stored in a non-transitory computer-readable medium (e.g., a memory).

In some implementations, the device corresponds to the controller 110 in FIGS. 1 and 2. In some implementations, the device corresponds to a hand-held electronic device (e.g., a mobile phone, tablet, laptop, wearable computing device, or the like) and the CGR environment corresponds to a composite of video pass-through or optical see-through of a physical environment with CGR content, including the CGR item. In some implementations, the device corresponds to a head-mounted device (e.g., the HMD 120 in FIG. 1).

In some implementations, the one or more feedback devices correspond to a haptics engine, display devices, audio generation devices, and/or the like. For example, the one or more feedback devices are embedded in the HMD 120 in FIG. 1, the hand-held devices 130A and 130B in FIG. 1, and/or a suitable combination thereof. In some implementations, the one or more input devices correspond to buttons, joysticks, an IMU, a gyroscope, an accelerometer, image sensors, physiological sensors, grip sensors, a gazer tracker, microphones, and/or the like. For example, the one or more inputs devices are embedded in the HMD 120 in FIG. 1, the hand-held devices 130A and 130B in FIG. 1, the motion capture devices 170A and 170B in FIG. 1, and/or a suitable combination thereof.

As represented by block 10-1, the method 1000 includes obtaining sensor data. In some implementations, the sensor data includes data obtained from one or more sensors (e.g., associated with the HMD 120, the hand-held devices 130A and 130B, and/or the optional motion capture devices 170A and 170B in FIG. 1). Examples of the sensors include image sensors, accelerometers, gyroscopes, depth sensors, IMUs, IR sensors, gaze trackers, and/or the like.

As represented by block 10-2, the method 1000 includes processing the sensor data to obtain user movement information, including bode pose and trajectory of the user. In some implementations, the device generates the user movement information based on the sensor data. Obtaining the user movement information is described in more detail above with respect to FIG. 8 and, more specifically, the block 8-1 of the method 800.

As represented by block 10-3, the method 1000 includes obtaining placement information for a CGR item. In some implementations, the device obtains coordinates for CGR items within the CGR environment.

As represented by block 10-4, the method 1000 includes determining whether or not the user movement information indicates a virtual interaction with the CGR item. As one example, with reference to FIGS. 1 and 2, the controller 110 or a component thereof (e.g., the prediction unit 245) determines whether the user movement information indicates the occurrence of a virtual interaction with the CGR item based on the placement information for a CGR item.

If the user movement information does not indicate a virtual interaction with the CGR item (the "NO" branch from block 10-4), the method 1000 continues to block 10-5. If the user movement information indicates a virtual interaction with the CGR item (the "YES" branch from block 10-4), the method 1000 continues to block 10-6.

As represented by block 10-5, the method 1000 includes forgoing generation of a predicted virtual interaction time.

As represented by block 10-6, the method 1000 includes generating a predicted virtual interaction time based on the placement of the CGR item and the user movement information. As one example, with reference to FIGS. 1 and 2, the controller 110 or a component thereof (e.g., the prediction unit 245) generates a predicted virtual interaction time for a virtual interaction based at least in part on a placement of the CGR item in the CGR environment and the user movement information obtained by the controller 110 or a component thereof (e.g., the data obtaining unit 242). Generation of a predicted virtual interaction time is described in more detail above with respect to FIG. 8 and, more specifically, the block 8-2 of the method 800.

As represented by block 10-7A, the method 1000 includes determining initiation time A for feedback device A based on the predicted virtual interaction time and predetermined latency A for the feedback device A. As represented by block 10-7N, the method 1000 includes determining initiation time N for feedback device N based on the predicted virtual interaction time and predetermined latency N for the feedback device N. While the method 1000 includes determining initiation times A and N, those of ordinary skill in the art will appreciate from the present disclosure that various implementations of the method 1000 may include generating any number of initiation times. In some implementations, an initiation time is determined for each feedback device. In some implementations, an initiation time is determined for feedback devices included in a sensation profile associated with the virtual interaction.

As one example, with reference to FIGS. 1 and 2, the controller 110 or a component thereof (e.g., the coordination unit 246) determines initiation time A for a feedback device A based at least in part on the predicted virtual interaction time determined by the controller 110 or a component thereof (e.g., the prediction unit 245) and a predetermined latency period A associated with the feedback device A. As one example, with reference to FIGS. 1 and 2, the controller 110 or a component thereof (e.g., the coordination unit 246) determines initiation time N for a feedback device N based at least in part on the predicted virtual interaction time determined by the controller 110 or a component thereof (e.g., the prediction unit 245) and a predetermined latency period N associated with the feedback device N.

As represented by block 10-8, the method 1000 includes coordinating initiation of feedback A from the feedback device A at the initiation time A with, . . . , initiation of feedback N from the feedback device N at the initiation time N in order to satisfy a performance criterion that corresponds to the virtual interaction with the CGR item. As one example, with reference to FIGS. 1 and 2, the controller 110 or a component thereof (e.g., the coordination unit 246) causes initiation of feedback A, by feedback device A, at the initiation time A and initiation of feedback N, by feedback device N, at the initiation time N.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first input could be termed a second input, and, similarly, a second input could be termed a first input, which changing the meaning of the description, so long as all occurrences of the "first input" are renamed consistently and all occurrences of the "second input" are renamed consistently. The first input and the second input are both inputs, but they are not the same input.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including one or more processors, non-transitory memory, and one or more user interaction hardware components configured to enable a user to play a virtual instrument in a computer-generated reality (CGR) environment:
   obtaining user movement information, wherein the user movement information characterizes real-world body pose and trajectory information of the user;
   generating, from real-world user movement information and a predetermined placement of the virtual instrument in the CGR environment, a predicted virtual instrument interaction time for a virtual instrument interaction prior to the virtual instrument interaction occurring;
   determining whether or not the predicted virtual instrument interaction time falls within an acceptable temporal range around one of a plurality of temporal sound markers; and
   in response to determining that the predicted virtual instrument interaction falls within the acceptable temporal range around a particular temporal sound marker of the plurality of temporal sound markers, quantizing the virtual instrument interaction by presenting play of the virtual instrument to match the particular temporal sound marker of the plurality of temporal sound markers.

2. The method of claim 1, wherein the predetermined placement of the virtual instrument in the CGR environment includes coordinates of at least one surface of the virtual instrument in the CGR environment.

3. The method of claim 1, wherein the one or more user interaction hardware components include a head-mountable display.

4. The method of claim 1, wherein the one or more user interaction hardware components include one or more hand-held devices.

5. The method of claim 1, wherein the user movement information includes information characterizing a velocity of user interaction with at least one user interaction hardware component of the one or more user interaction hardware components.

6. The method of claim 1, wherein the user movement information includes information characterizing an acceleration of user interaction with at least one user interaction hardware component of the one or more user interaction hardware components.

7. The method of claim 1, wherein the user movement information includes information characterizing a direction of user gaze.

8. The method of claim 1, wherein obtaining the user movement information includes determining the user movement information.

9. The method of claim 1, wherein determining the user movement information comprises determining the user movement information using one or more image sensors.

10. The method of claim 9, wherein the one or more image sensors include a forward-facing camera, wherein the forward-facing camera is configured to capture images from a point of view characterized by an axis substantially parallel to an axis characterizing a point of view of the user.

11. The method of claim 9, wherein the one or more image sensors include a non-forward-facing camera, wherein the non-forward-facing camera is configured to capture images from a point of view characterized by an axis substantially perpendicular to an axis characterizing a point of view of the user.

12. The method of claim 11, wherein the non-forward-facing camera is a downward-facing camera.

13. The method of claim 1, further comprising:
    obtaining one or more images captured by one or more image sensors; and
    processing the one or more images to extract one or more image features; and
    wherein determining the one or more user movement information includes determining information characterizing real-world body pose and trajectory information of the user from the one or more image features.

14. The method of claim 1, wherein determining the user movement information comprises determining the user movement information using an inertial measurement unit in at least one user interaction hardware component of the one or more user interaction hardware components.

15. The method of claim 1, wherein the acceptable temporal range is determined based on data characterizing past user interaction with the device.

16. The method of claim 1, further comprising:
determining the acceptable temporal range around each sound marker of the plurality of temporal sound markers.

17. The method of claim 1, wherein presenting play of the virtual instrument comprises producing one or more CGR feedbacks.

18. The method of any of claim 17, wherein the one or more CGR feedbacks include an audio feedback.

19. The method of any of claim 17, wherein the one or more CGR feedbacks include a video feedback.

20. The method of any of claim 17, wherein the one or more CGR feedbacks include a haptic feedback.

21. The method of claim 1, wherein the device is configured to translate the user movement information into a virtual instrument interaction.

22. The method of claim 21, wherein translating the user movement information into a virtual instrument interaction includes determining that real-world body pose and trajectory information of the user falls within a three-dimensional region associated with a particular virtual instrument interaction.

23. A device comprising:
one or more processors;
a non-transitory memory;
one or more user interaction hardware components configured to enable a user to play a virtual instrument in a computer-generated reality (CGR) environment; and
one or more programs stored in the non-transitory memory, which, when executed by the one or more processors, cause the device to:
obtain user movement information, wherein the user movement information characterizes real-world body pose and trajectory information of the user;
generate, from real-world user movement information and a predetermined placement of the virtual instrument in the CGR environment, a predicted virtual instrument interaction time for a virtual instrument interaction prior to the virtual instrument interaction occurring;
determine whether or not the predicted virtual instrument interaction time falls within an acceptable temporal range around one of a plurality of temporal sound markers; and
in response to determining that the predicted virtual instrument interaction falls within the acceptable temporal range around a particular temporal sound marker of the plurality of temporal sound markers, quantize the virtual instrument interaction by presenting play of the virtual instrument to match the particular temporal sound marker of the plurality of temporal sound markers.

24. The device of claim 23, wherein the one or more programs further cause the device to:
obtain one or more images captured by one or more image sensors; and
process the one or more images to extract one or more image features; and
wherein determining the one or more user movement information includes determining information characterizing real-world body pose and trajectory information of the user from the one or more image features.

25. The device of claim 23, wherein determining the user movement information comprises determining the user movement information using an inertial measurement unit in at least one user interaction hardware component of the one or more user interaction hardware components.

26. The device of claim 23, wherein the acceptable temporal range is determined based on data characterizing past user interaction with the device.

27. A non-transitory memory storing one or more programs, which, when executed by one or more processors of a device with one or more user interaction hardware components configured to enable a user to play a virtual instrument in a computer-generated reality (CGR) environment, cause the device to:
obtain user movement information, wherein the user movement information characterizes real-world body pose and trajectory information of the user;
generate, from real-world user movement information and a predetermined placement of the virtual instrument in the CGR environment, a predicted virtual instrument interaction time for a virtual instrument interaction prior to the virtual instrument interaction occurring;
determine whether or not the predicted virtual instrument interaction time falls within an acceptable temporal range around one of a plurality of temporal sound markers; and
in response to determining that the predicted virtual instrument interaction falls within the acceptable temporal range around a particular temporal sound marker of the plurality of temporal sound markers, quantize the virtual instrument interaction by presenting play of the virtual instrument to match the particular temporal sound marker of the plurality of temporal sound markers.

28. The non-transitory memory of claim 27, wherein the one or more programs further cause the device to:
obtain one or more images captured by one or more image sensors; and
process the one or more images to extract one or more image features; and
wherein determining the one or more user movement information includes determining information characterizing real-world body pose and trajectory information of the user from the one or more image features.

29. The non-transitory memory of claim 27, wherein determining the user movement information comprises determining the user movement information using an inertial measurement unit in at least one user interaction hardware component of the one or more user interaction hardware components.

30. The non-transitory memory of claim 27, wherein the acceptable temporal range is determined based on data characterizing past user interaction with the device.

\* \* \* \* \*